UNITED STATES PATENT OFFICE.

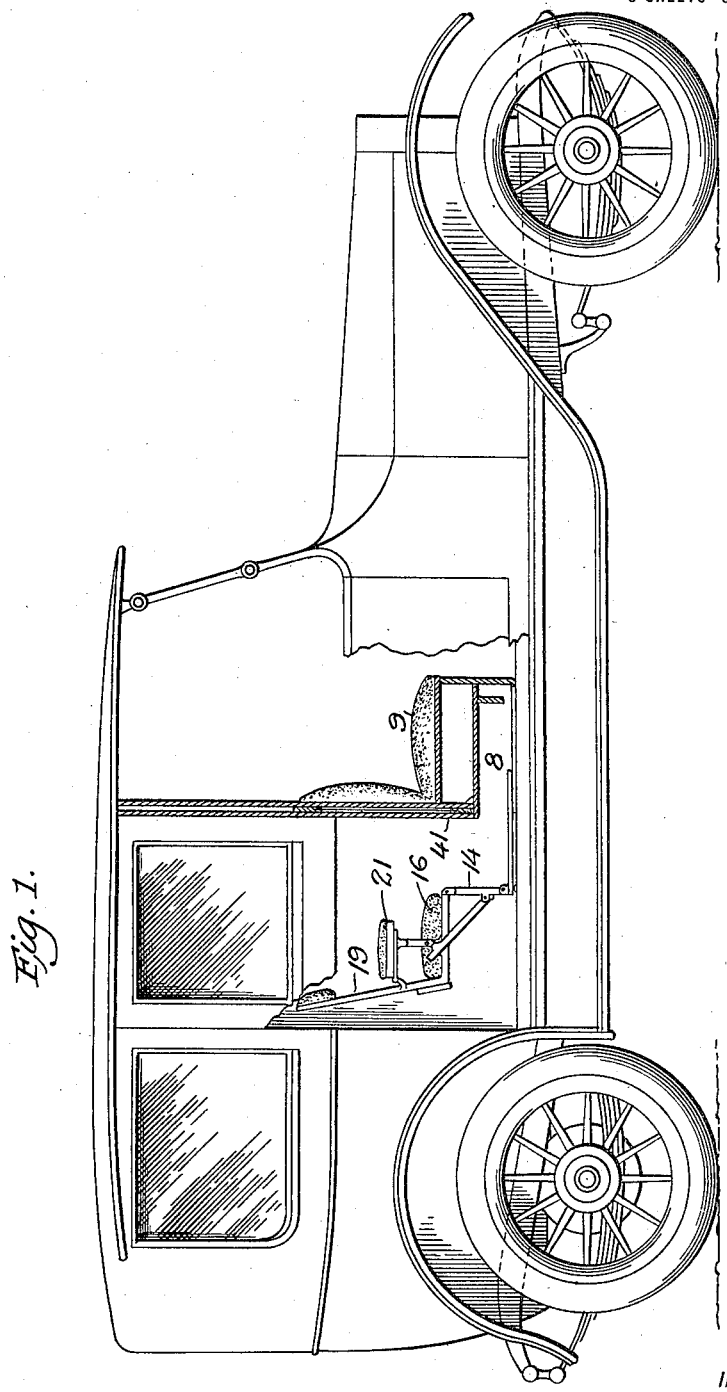

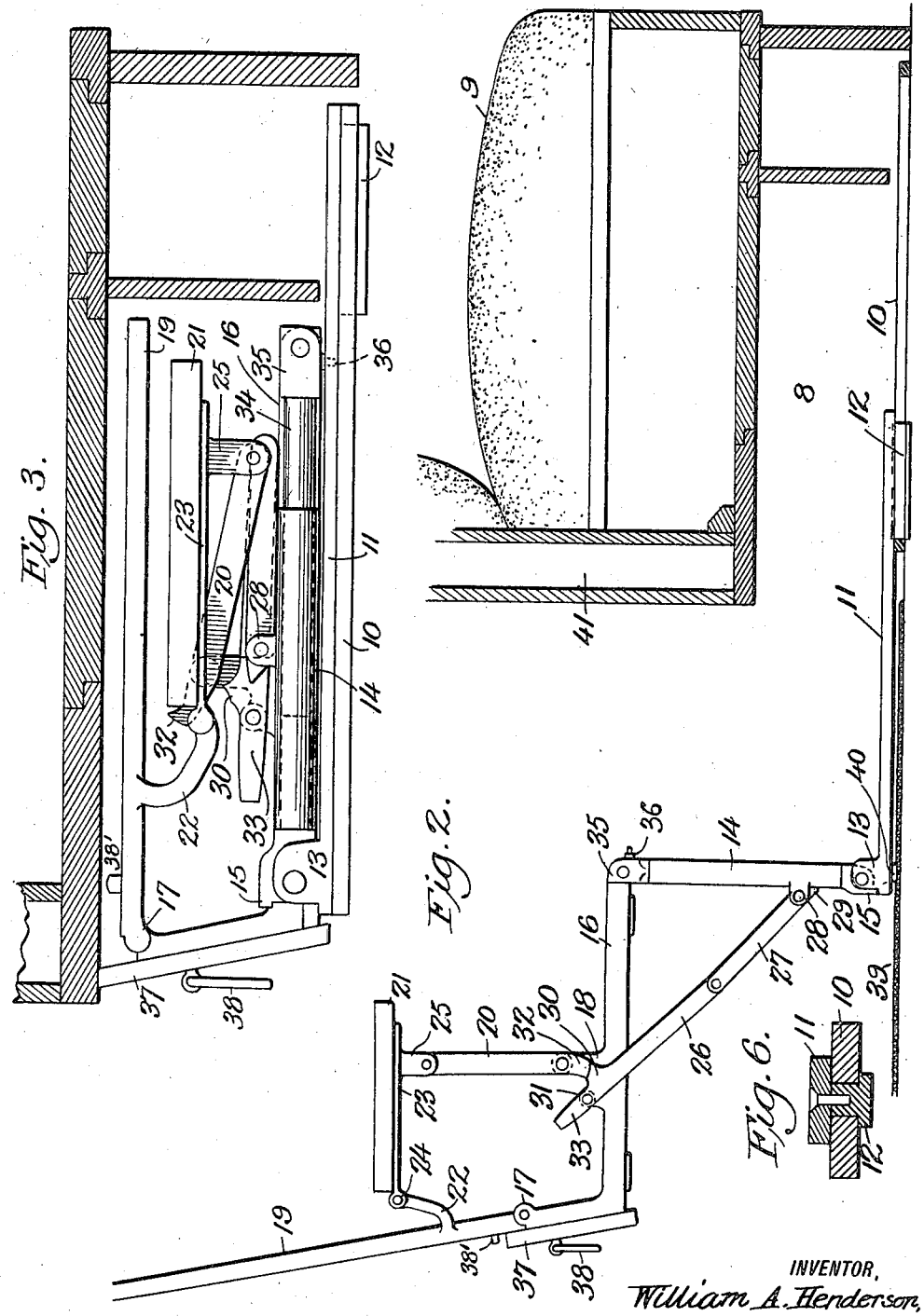

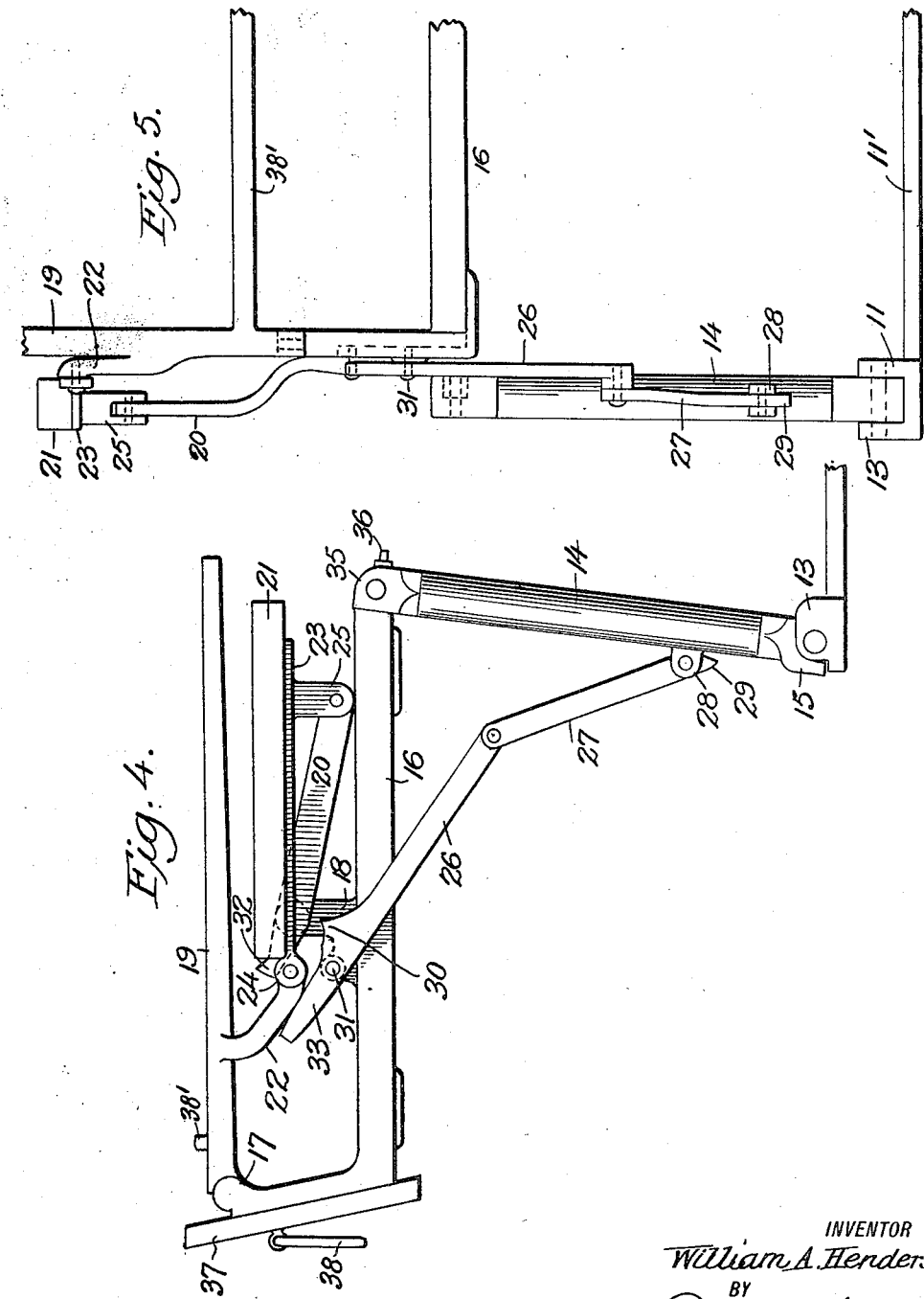

WILLIAM A. HENDERSON, OF LARCHMONT, NEW YORK, ASSIGNOR TO HOLBROOK COMPANY, OF NEW YORK, N. Y., A CORPORATION OF NEW YORK.

FOLDING SEAT FOR VEHICLES.

1,323,693.   Specification of Letters Patent.   Patented Dec. 2, 1919.

Application filed May 12, 1917. Serial No. 168,078.

*To all whom it may concern:*

Be it known that I, WILLIAM A. HENDERSON, a citizen of the United States, and resident of Larchmont, in the county of Westchester and State of New York, have invented certain new and useful Improvements in Folding Seats for Vehicles, of which the following is a specification.

This invention relates to folding seats and more especially to that class of seats adapted to be folded and stored in a compartment or recess of a vehicle and which is secured to the walls or floor of the same. When it is desired to use the seat, however, it is drawn out of the recess, unfolded and braced at a distance from the wall of its receptacle so that it will permit of the comfort of the occupant of the seat and at the same time require no cutting or mutilating of the floor or carpet of the vehicle; as will be more fully described in the following specification, set forth in the appended claims and illustrated in the accompanying drawings which form a part of this application and wherein:

Figure 1 is a partial sectional view of a motor vehicle showing the seat in use.

Fig. 2 is a sectional view through the front part of the vehicle and showing the seat drawn out of its receptacle and opened for use.

Fig. 3 is a similar sectional view on a larger scale showing the seat folded and within its recess.

Fig. 4 shows the method of folding the seat.

Fig. 5 is a rear view of one half of the seat.

Fig. 6 is a cross sectional view through the rail and the splined rod.

This improved seat is adapted to be folded and stored in a small compartment 8 beneath the driver's seat 9 of a vehicle and on the floor of the said compartment are rails 10 at each side thereof on which to slide a frame comprising bars 11 for each rail connected by the cross piece 11' and held on the rails by means of splines 12 playing in slots in the rails and grooves in the flooring beneath the rails.

At the outer end of the bar 11 is the knuckle 13 in which is pivoted the leg 14 whose movement in one direction is limited by the stop 15. The leg 14 is duplicated as is the slide bar 11, and the two legs are pivoted at their upper ends to the seat 16 whose two side edges are faced with metal plates to provide the hinge members 17 and 18, the former for the back frame 19 and the latter for the pivotal connection of a link 20 which supports the front end of the arm 21.

The said arm 21 is hinged at its rear end to a projection 22 from the back frame and for this purpose a plate 23 is provided for the lower face of the arm and has the hinge members 24 and 25. To the sides of the seat 16 are also pivoted the levers 26 of a toggle and the companion arm 27 of each lever is pivoted between the ears 28 of the leg 14 and whose movement downward is limited by the nose 29. The lever 26 has a shoulder 30 near its pivot 31 and against which an arm 32 of the link 20 impinges.

While the parts of the seat are open as in Fig. 2 the toggle is expanded and held in this position by the extension 32 bearing upon the shoulder 30 and it will be impossible to collapse the seat as long as these parts are in that position. When it is desired, however, to fold the seat, the back frame 19 is thrown forward and down into the position shown in Fig. 4 when the projection 22 will make contact with the upper end 33 of the lever 26 and break the joint, permitting the leg 14 to swing forward and down.

The leg 14 is telescopic and includes a rod 34, at the outer end of which is the pivot carrying head 35, and which enables the leg to conform with the length of the seat 16 when the device is folded.

The turning down of the back frame will give the seat sufficient impetus to drop into the position shown in Fig. 3 and a pin 36 falls into a perforation in the bar 11 and prevents the parts from moving and rattling when stored in the compartment 8.

When the seat occupies this position the mouth of the compartment is closed by means of a board 37 attached to the rear of the seat and carrying a swinging handle 38 and which may be upholstered similarly to the interior of the vehicle. The frame 19 may also be provided with the cross bar 38' to unite and brace the uprights at each side of the seat and the carpet 39 on the floor of the vehicle may be provided with a button 40 to support the outer end of the bar 11 and the weight of the seat.

Back of the seat 9 is a pocket 41 into which may be deposited the wind shield or any similar barrage that is used to shelter the occupants of the car and it provides sufficient depth to carry and conceal a shield of considerable size or to conceal an ordinary shield.

A folding seat of the above described type therefore possesses two very important advantages: It permits of the complete disappearance of the wind shield in consequence of the depth of the pocket 41 and the carpet of the vehicle is not marred by unsightly or dangerous cuttings.

To open and erect the seat it is drawn out of its compartment by means of the handle 38 and with a slight exertion is thrown into its upright position and locked there by the elevation of the back frame.

The pin 36 connects the seat with the rods 11 of the frame and draws the latter out until the seat is in position to rise, while the telescoping of the legs are controlled by the position of the seat.

It is obvious that the parts may be otherwise arranged and modified without departing from the essential features above described or from the scope of the appended claims.

What I claim as new is:

1. In folding seats, the combination with a permanent seat having a recess beneath same, of rails beneath the seat, sliding means on the rails, folding legs pivoted to the sliding means, a seat carried by the legs, a back for the seat, braces between the legs and the seat, and a cover for the recess carried by the seat.

2. In a folding seat, the combination with sliding means, of pivoted legs on the same, a seat carried by the legs, braces permanently attached to the seat and the legs and adapted to lock in an operative position, and means carried by the seat for unlocking and folding the braces.

3. In a folding seat, the combination with sliding means, of legs hinged at the end of the sliding means, a seat carried by the legs, braces adapted to be set between the seat and the legs and locked, a folding back and arms, and means carried by the back to unlock the braces.

4. In a folding seat, the combination with a vehicle car having a compartment, of sliding means working in and out of the compartment, legs at the outer end of the sliding means, a seat pivoted to the legs, toggle levers comprising braces, means for locking the braces when the seat is unfolded, and means connected with the seat for unlocking the braces.

5. In a folding seat, the combination with the driver's seat of a motor vehicle having a compartment beneath the same, of a frame adapted to slide in and out of the compartment, hinged legs at the outer end of the frame, a seat with folding arms, toggle levers supporting the seat, means for locking the levers, a folding back, and means connected with the arms for unlocking the toggle levers when the back is folded.

6. In a folding seat, the combination with the front stationary seat of a motor vehicle having a compartment under the same, of rails in the compartment, a sliding frame splined to the rails, telescopic legs hinged to the frame, a seat pivoted on the legs, toggle levers connecting the seat and legs and supporting the former, means for locking the levers in their supporting position, and a folding back having means for unlocking the levers.

7. In a folding seat, the combination with the driver's seat of a vehicle having a compartment beneath the same, of sliding means in the compartment, telescopic legs at the end of the sliding means, pins on the legs to engage perforations in the sliding means, a seat pivoted to the legs, toggle levers adapted to be locked to hold the seat and legs open, means at the end of the levers adapted to unlock them, and a back frame adapted to operate the unlocking means.

8. In a folding seat, the combination with pivoted legs, of a seat supporting the legs, toggle levers adapted to keep the seat and legs unfolded, a shoulder on one of the levers, an arm carried by the seat and adapted to impinge the shoulder and lock the lever while the seat is open, a back adapted to fold down on the seat, and a projection adapted to strike the end of the toggle lever and unlock the same.

9. In folding seats, the combination of a permanent seat having a recess beneath same, rails beneath the seat and in the recess, sliding members loosely secured to the rails, legs pivoted to the sliding members, a seat supported by the legs, braces for the seat, and a board at the back of the seat and adapted to close the recess when the seat is deposited therein.

10. In folding seats, the combination of a permanent seat having a recess beneath the same, slotted rails on the floor of the recess, sliding means loosely attached to the rails, a folding seat carried by the sliding means, a board at the back of the seat and adapted to close the recess when the seat is folded and stored in the same, and a handle on the board.

Signed at New York, in the county of New York, and State of New York, this 7th day of May A. D. 1917.

WILLIAM A. HENDERSON.